(12) United States Patent
Parker et al.

(10) Patent No.: US 7,101,057 B2
(45) Date of Patent: Sep. 5, 2006

(54) PISTOL GRIP FLASHLIGHT

(75) Inventors: David H. Parker, Torrance, CA (US); John Paul Hoven, Manhattan Beach, CA (US); Alstair Warren Jarrett, Long Beach, CA (US); Kevin Deighton, Long Beach, CA (US)

(73) Assignee: Pelican Products, Inc., Torrance, CA (US)

( * ) Notice: Subject to any disclaimer, the term of this patent is extended or adjusted under 35 U.S.C. 154(b) by 651 days.

(21) Appl. No.: 09/933,562

(22) Filed: Aug. 20, 2001

(65) Prior Publication Data
US 2003/0035286 A1 Feb. 20, 2003

(51) Int. Cl.
*F21L 4/00* (2006.01)
*F21V 21/40* (2006.01)

(52) U.S. Cl. ............... 362/191; 362/190; 362/205; 362/399

(58) Field of Classification Search ............... 362/205, 362/158, 327, 110–114, 157, 183, 202, 296, 362/297, 310, 311, 347, 350, 197, 184, 190; 359/541; 116/63 P
See application file for complete search history.

(56) References Cited

U.S. PATENT DOCUMENTS

| 2,387,038 | A | * | 10/1945 | Owens ................. 359/541 |
| 2,593,942 | A | * | 4/1952 | Van Vliet .............. 362/112 |
| 3,794,825 | A | * | 2/1974 | Krupansky ............ 362/158 |
| 4,164,012 | A | * | 8/1979 | Gulliksen ............. 362/282 |
| 4,207,607 | A | * | 6/1980 | Gulliksen ............. 362/282 |
| 4,734,832 | A | * | 3/1988 | Moriano et al. ........ 362/158 |
| 6,053,623 | A | * | 4/2000 | Jones et al. .......... 362/310 |
| 6,056,414 | A | * | 5/2000 | Krieger .............. 362/184 |
| 6,364,504 | B1 | * | 4/2002 | Hon ................. 362/208 |
| 6,536,369 | B1 | * | 3/2003 | Bent et al. ............ 116/63 P |

* cited by examiner

*Primary Examiner*—Sandra O'Shea
*Assistant Examiner*—Anabel Ton
(74) *Attorney, Agent, or Firm*—Greenberg Traurig LLP (57) ABSTRACT

A flash light has a barrel for batteries, a lamp, a switch for opening and closing a circuit a lens, a cap, and a pistol grip handle extending transversely from the barrel. The handle includes a trigger with a magnetic to activate the switch in the barrel. The barrel is watertight between the barrel, the cap and a transparent face mounted with the cap. A reflective parabolic lens surface has multiple protrusions arranged on the reflective surface.

68 Claims, 6 Drawing Sheets

PISTOL GRIP FLASHLIGHT

BACKGROUND OF THE INVENTION

1. Field of the Invention

This invention relates to flashlights, and reflector lenses for flashlights. In particular the invention is concerned with a flashlight configuration which is watertight. More so the inventon is also concerned with a flashlight which can be operated without effecting the integrity of the flashlight electronics and electrics.

2. General Background and State of the Art

Different flash lights are known which a barrel for mounting batteries, a lamp, a switch, a circuit, and the switch being for opening and closing the circuit between the batteries and the lamp. These flash lights also include a lens.

The different flashlights are not appropriately waterproof, ergonomic, and nor do they have the appropriate characteristics to effect a good broad light beam.

The invention is directed to providing a flashlight with advantageous properties over known flashlights.

SUMMARY OF THE INVENTION

According to the invention there is provided a flashlight comprising a barrel, the barrel being for mounting batteries, a lamp, a switch, a circuit, the switch being for opening and closing the circuit, the circuit being between the batteries and the lamp. There is also a lens, a cap for the barrel, and a pistol grip handle extending transversely from the barrel.

The handle includes a mounting for a trigger, and the trigger includes magnetic means being operable to activate the switch through a wall of the barrel, and the switch being contained inside the barrel. The flashlight barrel has a forward end and a rear end, and the handle engages the barrel at a position substantially midway between the forward end and the rear end. The barrel is substantially partially egg-shaped from the forward end to the rear end, and the forward end being substantially truncated and being for receiving the cap. The truncation effectively creates a half-egg shape.

The trigger is mounted in a housing, the housing being removably lockable in a receptacle, and the housing being capable of being removed from the receptacle on release of the locking. The trigger is contained in a housing, and the housing is at least partly retained in position in a receptacle in the handle by the cap.

There is a gasket between the cap and the barrel, and the gasket permits a watertight seal to be formed between the barrel, the gasket, the cap and a transparent face mounted with the cap.

The lens includes a reflective surface, the reflective surface being substantially parabolic with multiple protrusions arranged on the reflective surface. The multiple protrusions are substantially hemispherical protrusions arranged around the reflective surface. The protrusions are arranged in rows from a base of the parabolic reflector towards the edge of the parabolic reflector, there being multiple protrusions in each row. Preferably successive rows are offset relative to protrusions in adjacent rows. More specifically the protrusions substantially adjacent to the base of the parabolic reflector are relatively smaller than the size of the protrusions towards the edge of the parabolic reflector.

In one preferred form the protrusions are substantially hemispherical formations and the diameter of the hemispheres at the area towards the edge of the reflector is greater than the diameter of the hemispheres toward the base of the parabolic reflector.

The lamp includes a filament, the filament being located substantially at the vertex of the parabolic reflector and the array of protrusions on the reflector surface is adapted to disperse a fraction of light intensity into a relatively conical pattern of light, the dispersion resulting into a relatively larger diameter of light pattern emanating from the lamp.

The batteries are mounted in a housing, the housing being removable from the barrel when the cap is removed from the barrel. The housing is a substantially cylindrical element for mounting multiple batteries in an axial relationship around the axis of the housing. There is a mounting for a switch and circuit on an outside wall of the housing. The switch is electronic, and includes a reed switch operable by the trigger on the handle. The operation of the flashlight by the switch is effected by an element mounted on the flashlight unassociated with the housing.

Further aspects of the present invention will become apparent in the course of the following description and by reference to the attached drawings.

DETAILED DESCRIPTION OF THE PREFERRED EMBODIMENTS

The present invention will now be described in detail with reference to a few preferred embodiments thereof, as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order to not unnecessarily obscure the present invention.

A flash light comprises a barrel, the barrel being for mounting batteries, a lamp, a switch, a circuit, the switch being for opening and closing the circuit, the circuit being between the batteries and the lamp. There is also a lens, a cap for the barrel, and a pistol grip handle extending transversely from the barrel.

Figure 1:
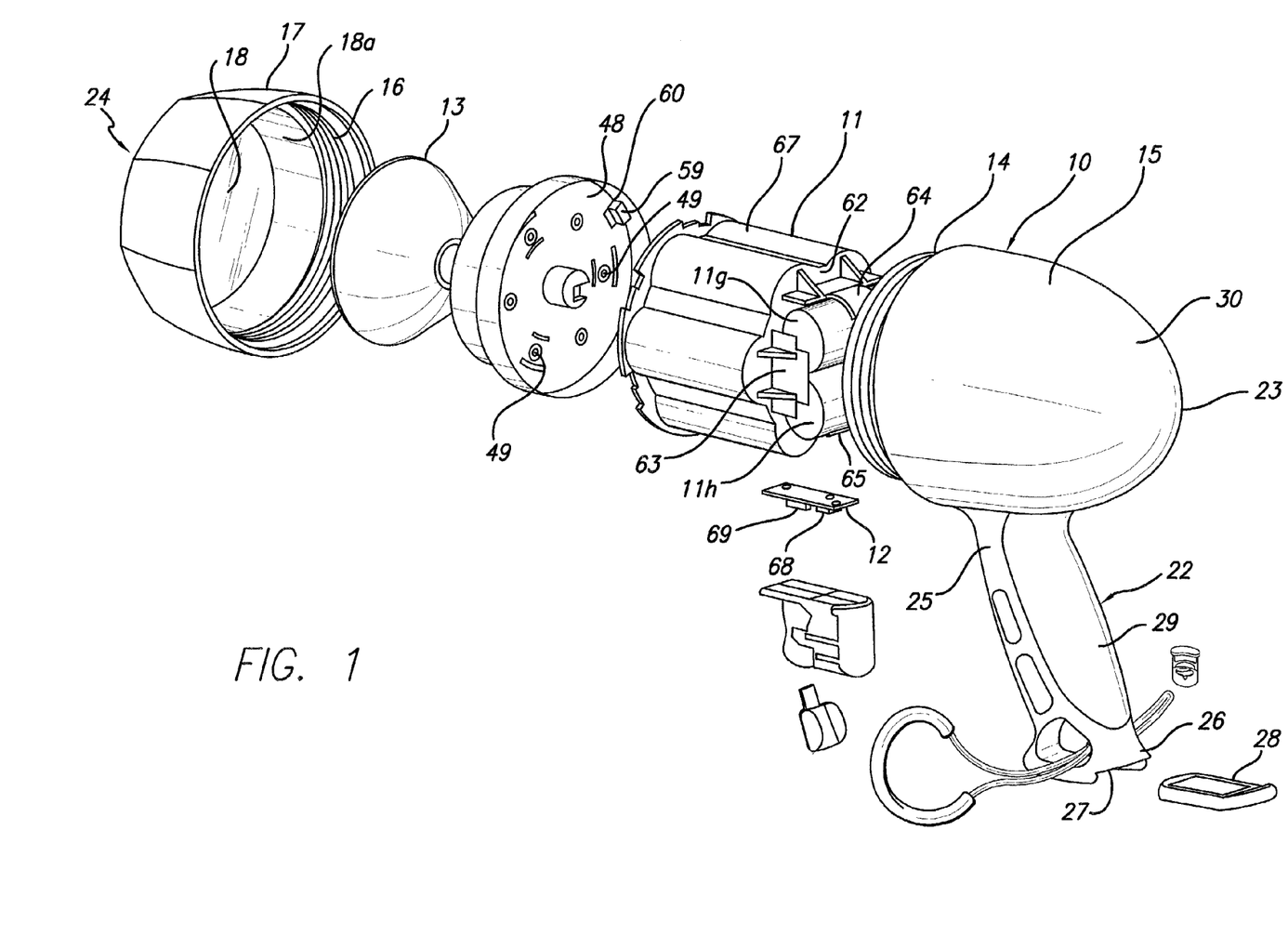
FIG. 1 is a perspective view with parts separated, viewing the flashlight from the rear.
Figure 2:
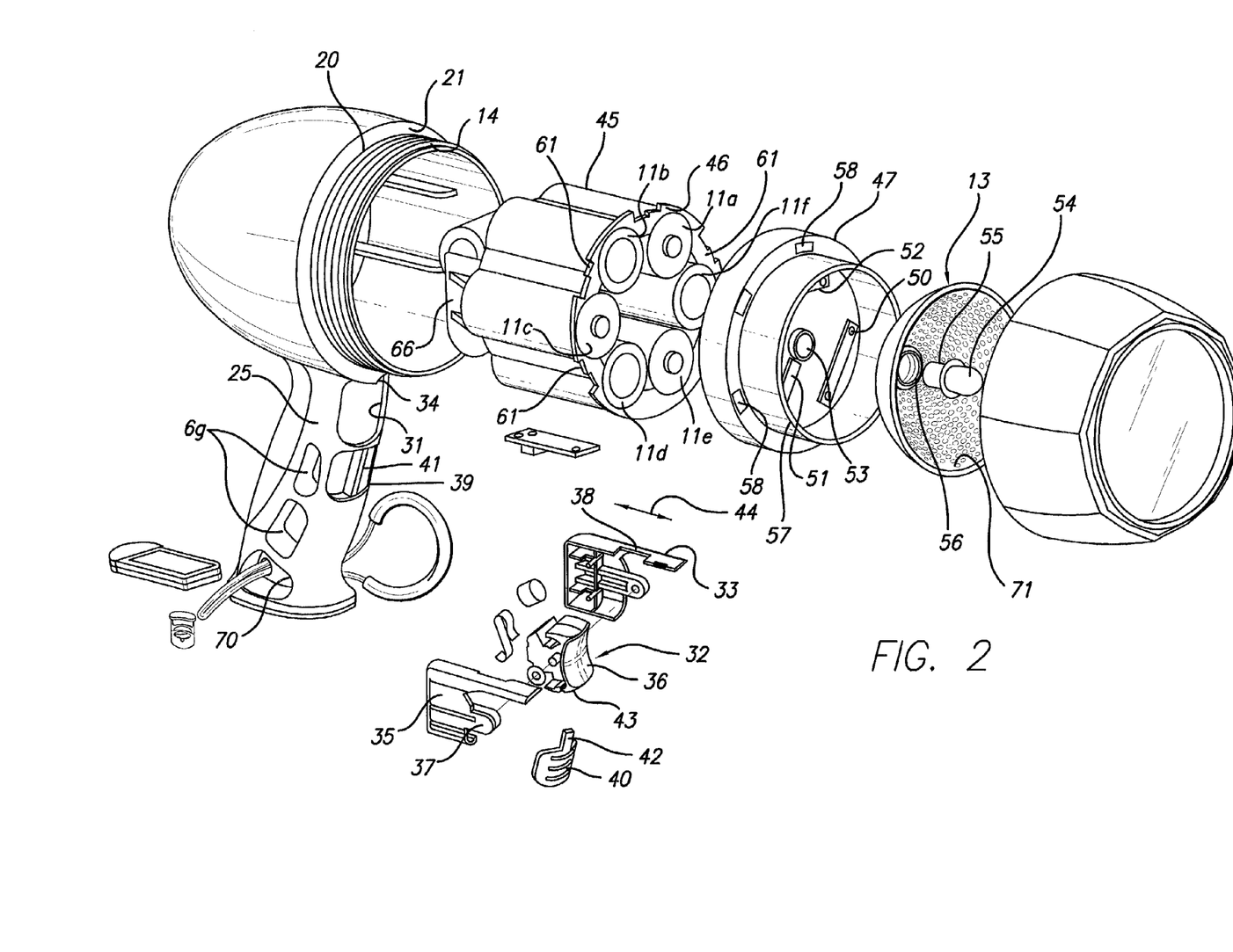
FIG. 2 is a perspective view of the flashlight with the parts separated, viewing the flashlight from the forward position.

The flashlight includes a barrel 10, within which is mounted batteries 11a, 11b, 11c, 11d, 11e, 11f, 11g, and 11h. There is also an electronic switch 12 in the barrel 10 and a lens reflector 13. The barrel 10 includes a threaded forward portion 14 on the outside surface of the wall 15 of the barrel, and the threaded portion 14 engages the internal threaded portion 16 on the cap 17. The cap 17 includes a transparent face 18 mounted at the forward end. There is also a circular O-ring gasket which is located at the rear of the screw-threaded portion 14, where it engages the shoulder 21 of the barrel. The screw-threaded portion 14 is located on a neck portion ahead of the shoulder 21. When the cap 17 is screwed down on the barrel portion, a tight, substantially waterproof or leak-proof seal is obtained to the configuration of the barrel and the enclosing cap 17. By this configuration, a substantially leak-proof construct is obtained for the contents within the barrel and cap.

The handle includes a mounting for a trigger, and the trigger includes magnetic means being operable to activate the switch through a wall of the barrel, and the switch being contained inside the barrel. The flashlight barrel has a forward end and a rear end, and the handle engages the barrel at a position substantially midway between the forward end and the rear end. The barrel is substantially partially egg-shaped from the forward end to the rear end, and the forward end being substantially truncated and being for receiving the cap. The truncation effectively creates a half-egg shape.

The trigger is mounted in a housing, the housing being removably lockable in a receptacle, and the housing being capable of being removed from the receptacle on release of the locking. The trigger is contained in a housing, and the housing is at least partly retained in position in a receptacle in the handle by the cap.

Depending from the wall 15 of the barrel, there is a pistol handle 22, which extends in a general line from about midway between the rear end 23 of the barrel and the forward end 24 of the barrel. The pistol grip in part is formed to be contiguous with the wall of the barrel. The portion 25 that is contiguous is formed of the same material and is essentially molded as one component with the barrel. The pistol grip handle 22 slants backwards towards the rear 23 of the barrel such that the rear portion 26 of the pistol grip is substantially aligned with the rear end 23 of the barrel 10.

In the base 27 of the pistol grip 22, there is a foot 28 which is slidable in and out of the base 27. The foot can be used for name engraving or other features to be added to the flashlight. The pistol grip 22 also contains a second material 29 which is formed of a relatively flexible elastic or resilient cushion-like component which is separately molded to the back of the pistol grip. This material also extends to zone 30, which is at the rear of the flashlight. Conveniently, the color of the material 29 and 30 is different from the material constituting element 25 wall 15, in other words to produce an effect of two-tone appearance to the flashlight. The material of element 25 and the wall 15 is a more durable and rigid plasticized material which is separately molded from the barrel portion.

The portion 30 at the rear of the barrel overlays the back of the material, constitutes the wall 15, and so in effect the flashlight is formed by two different plastic-type materials. The wall 15 below the material 30 constituting the rear cushioned element at the back of the flashlight. In this fashion, the integrity of the wall 15 is retained together with the cap 17. Also, to ensure the integrity of the barrel, the location of the area of joinder of the pistol grip handle 22 and the wall 15 is created without any apertures between these components.

There is a gasket between the cap and the barrel 10, and the gasket permits a watertight seal to be formed between the barrel, the gasket, the cap 17 and a transparent face mounted with the cap 17.

The forward portion of the pistol grip 22 is provided with a receptacle 31 for receiving a trigger 32. The trigger 32 has a top plate 33, which slides into a reception slot 34 at the top of the receptacle 31. The trigger 32 can be removed and placed in position in the receptacle, when the cap 17 is removed from the front of the barrel. When the cap 17 is in location over barrel, the peripheral edge of the cap 17 overlaps the location where plate 33 sitting in its receptive zone 34, and thus the trigger 32 cannot be removed from its position in the receptacle 31.

The trigger 32 is actually formed in a housing 35, and a finger rock arm 36 is mounted on pivots 37 in the forward portion of the housing 35. Behind the finger rockable arm 36 there is located one or two magnets 38. The magnets 38 operate with the electronic switch mounted in the barrel 10 in a manner which is described in further detail.

The handle 22 also includes a slot 39 for receiving a trigger lock 40. The trigger lock rides on a rail 41 and has a protruding portion 42 ahead of the trigger lock which is for engaging a slot 43 in the base of the rockable trigger element. When the trigger lock 40 is in a forward position, it locks the trigger in the "off" function. The operation of the trigger is to move the magnets 38 forwards and backwards as indicated by arrow 44. The movement of the magnet 38 acts to work with the electronic switch 12 in a manner which will be described below. The electronic switch is contained inside of the barrel; the magnet is contained outside of the barrel 10.

The six batteries 11a through 11f are contained in an axial relationship around the perimeter of the battery housing 45 and are located in alternative negative-to-positive, positive-to-negative relationships. The top edge 46 of the battery housing 45 is closed with a battery housing cap 47. The back face 48 of the closure cap 47 has multiple terminals 49 arranged to contact the ends of the batteries 11a through 11f. The opposite phase of the terminals 49 has some contact strips 50, 51, and 52, arranged to close the circuit of the various batteries and also to make a connection with the central core or housing 54, which secures the lamp 54. The lamp 54 has a side contact 55 and a central contact 56, which connects respectively with the strips 51 and 57 as indicated to close the circuit around the lamp.

Also around the circumference of the end cap 47 there are provided space slots 58, which have a tongue element 59 removed behind the slot such that there is a gap 60. Complimentary space tongue 61 are arranged around periphery of the housing for engaging in the space 60. This is done by tongue and groove formation wherein the cap 47 is located onto the top of the housing 45 so that the tongues 61 engage about its axis in a clockwise position to effect closure. Opening is effected by turning the cap 47 oppositely.

On the rail walls 62 of the housing 45 are two batteries, 11g and 11h. These are part of the circuit of the flashlight. The batteries 11g and 11h are connected through strips 63, 64, 65, and 66, as indicated. Further contacts are provided on the inside of the strips to effect inclusion of all the batteries in the circuit].

Figure 3:
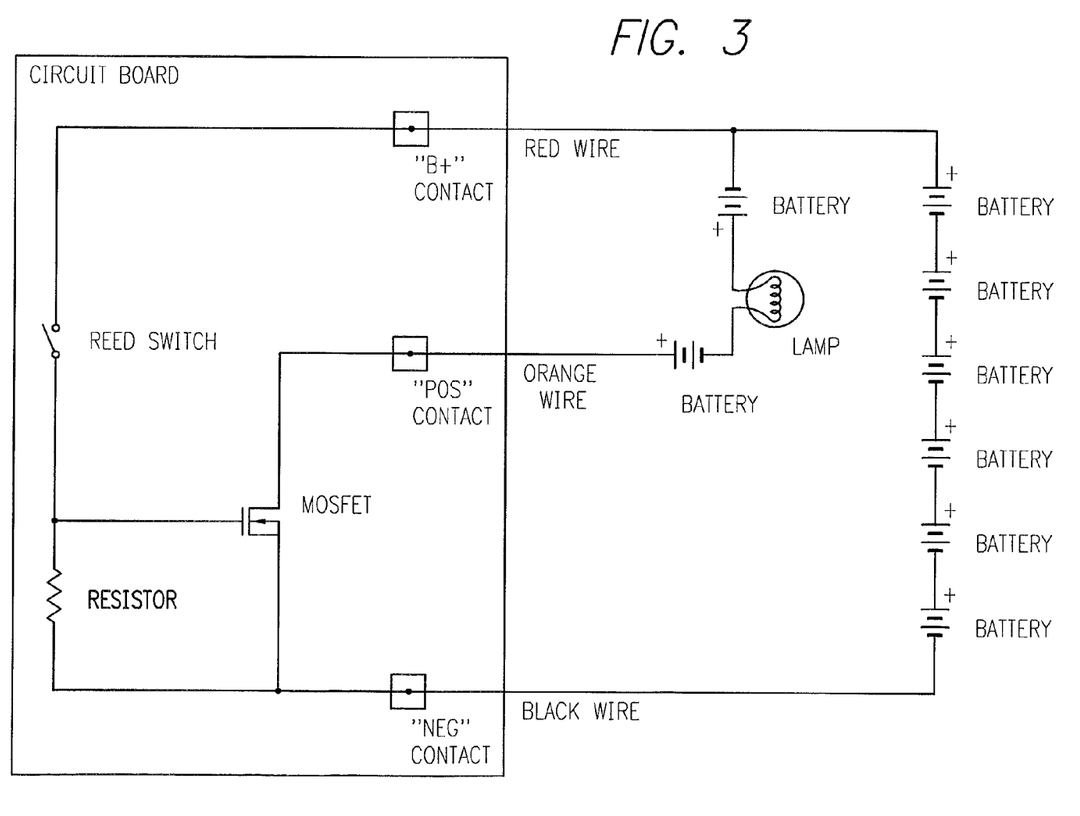
FIG. 3 is a schematic of the electronic switch.

On the outside circumference wall 67 of the battery housing there is an area which mounts the circuit board of the electronic switch 12. The switch is mounted to be longitudinally relative to the axis of the barrel 15 and the battery housing and is essentially parallel to the batteries 11a through 11f. The electronic circuit includes switch 68 and an electronic circuit including a transistor 69. The reed switch 68 is part of that circuit.

When the battery pack 45 is aligned in the barrel 10 the electronic switch 12 is aligned opposite to the trigger. Thus as the magnet 38 moves backwards and forwards as shown by arrow 34 the read switch 68 to open and close and thereby permits an electronic circuit to operate to open and close and thereby light the lamp 54 or switch off the lamp.

The cap 17 includes the transparent face 18. This also has a depending skirt 18a which is bonded to the inside of the cap 17. The peripheral end of the skirt 18a and is adjacent to the inside thread 16 formed so as to achieve a watertight seal between the skirt 18a and the cap 17.

The arrangement of the pistol grip handle 22 is such that the elements 69 are cut out from the body portion 25 of the handle. This effectively makes the handle relatively lighter but still retains the structural integrity of the handle. A hole 70 is provided towards the base of the handle 22 to permit the flashlight to have an anchoring cord attached so that in some uses the flashlight can depend from a person's arm or other element on the person's body. In a diving condition his life may usefully depend on the wetsuit or belt when not in use.

Figure 4:
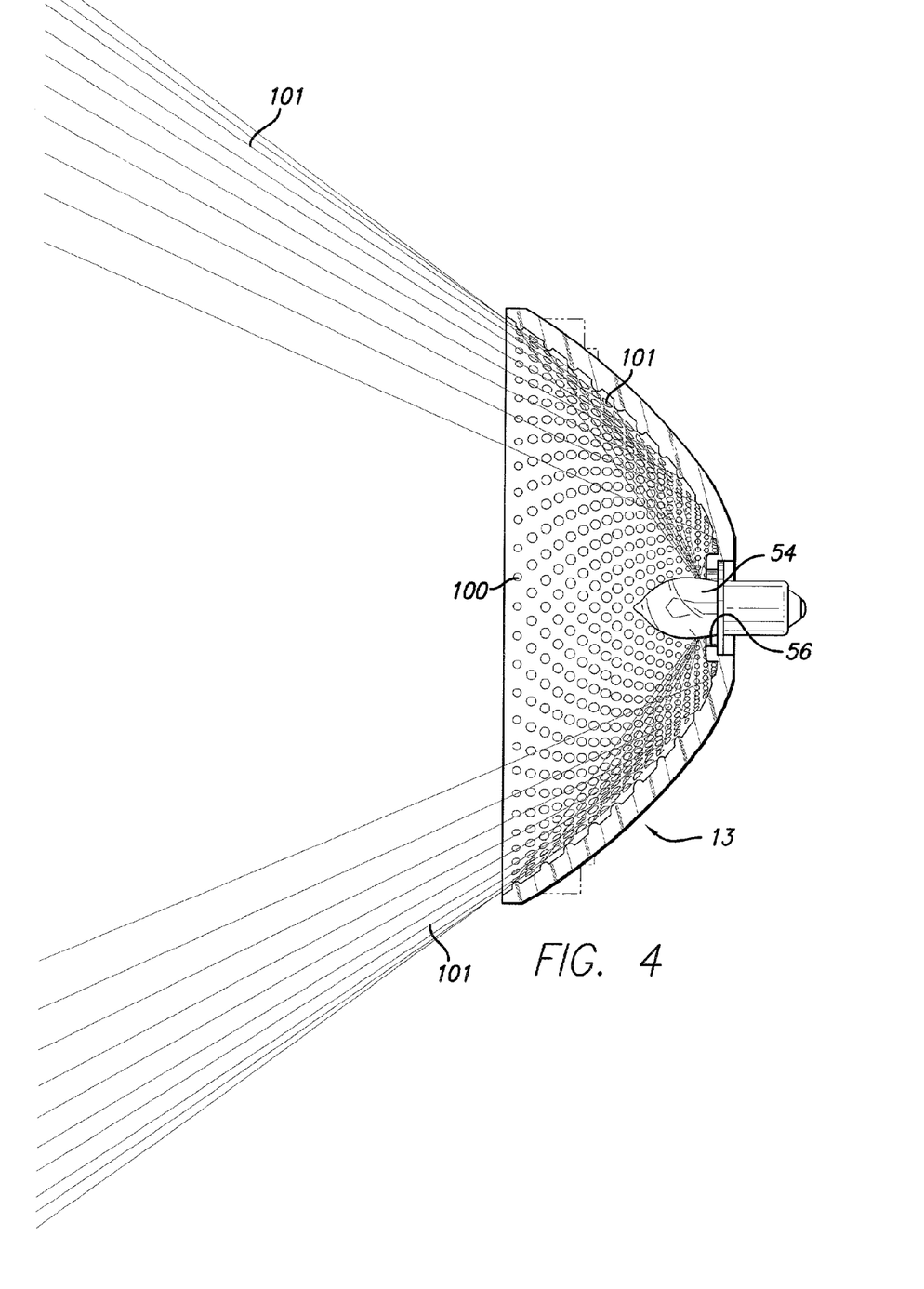
FIG. 4 is a detailed side view of the reflector lens showing the protrusions, and the angularly reflected light rays.
Figure 5:
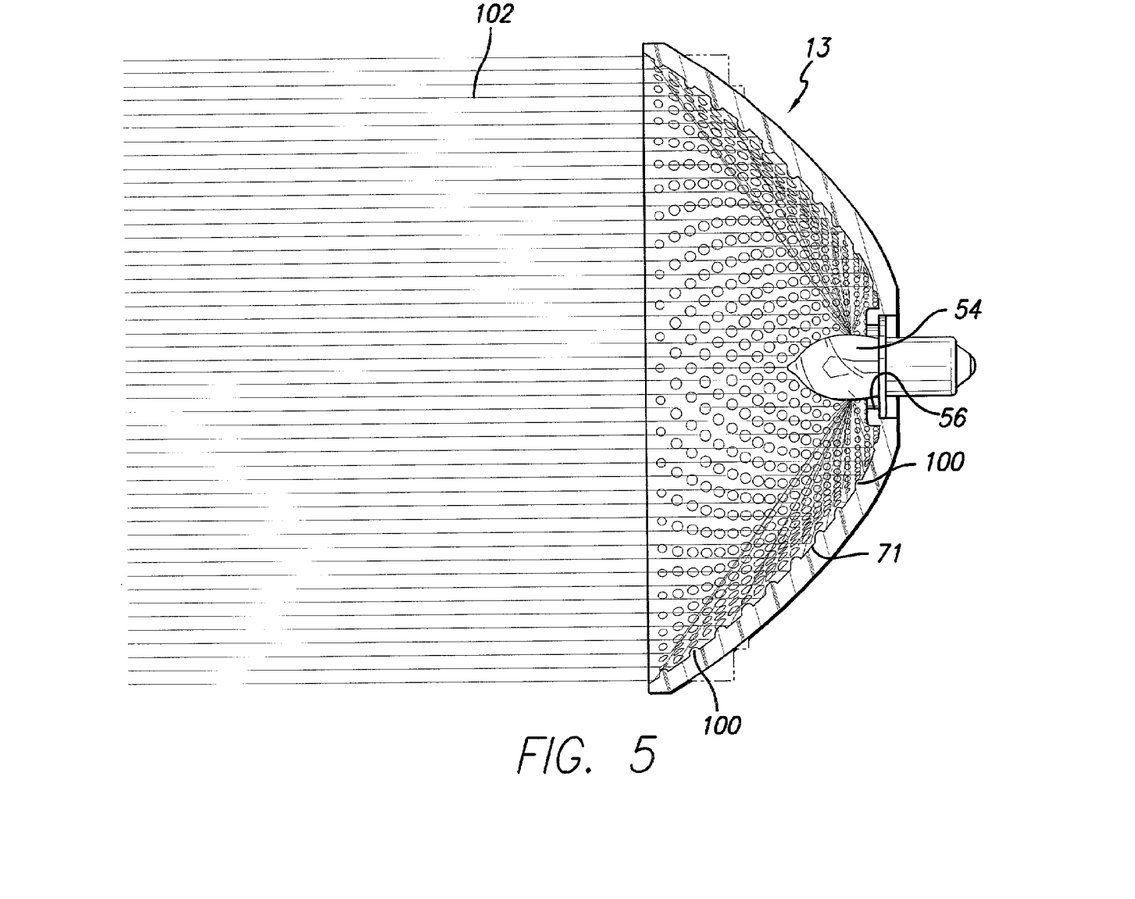
FIG. 5 is a detailed view of the reflector lens showing the protrusions, and the parallel reflected light rays.

The reflector 13 is formed so that the filament of the lamp 54 is located at the vertex of the parabolic effect of the reflector. This relationship provides a situation so that light from the lamp 54 is reflected from the reflector in an axially directed column forwardly outside of the face 18. The beam column may normally not be perfectly formed or directed due to unintentionally created imperfections on the reflective surface or the misallocation of the lamp relative the vertex.

Intentionally formed features 100 are provided on the reflective surface 71 which creates irregularities on the reflective surface 71 of the reflector 13. These multiple features cause a dispersion of the light in a conical peripheral pattern 101 relative to the central column 102. The features are shown as projections or protrusions from the surface 71. In other cases there may be indentations on that surface 71. There are different shapes which are possible for the features and arrangements of the textured surface can be provided to achieve the desired effect. The intensity of beam 102 is greater than the conical dispersion 101.

Figure 6:
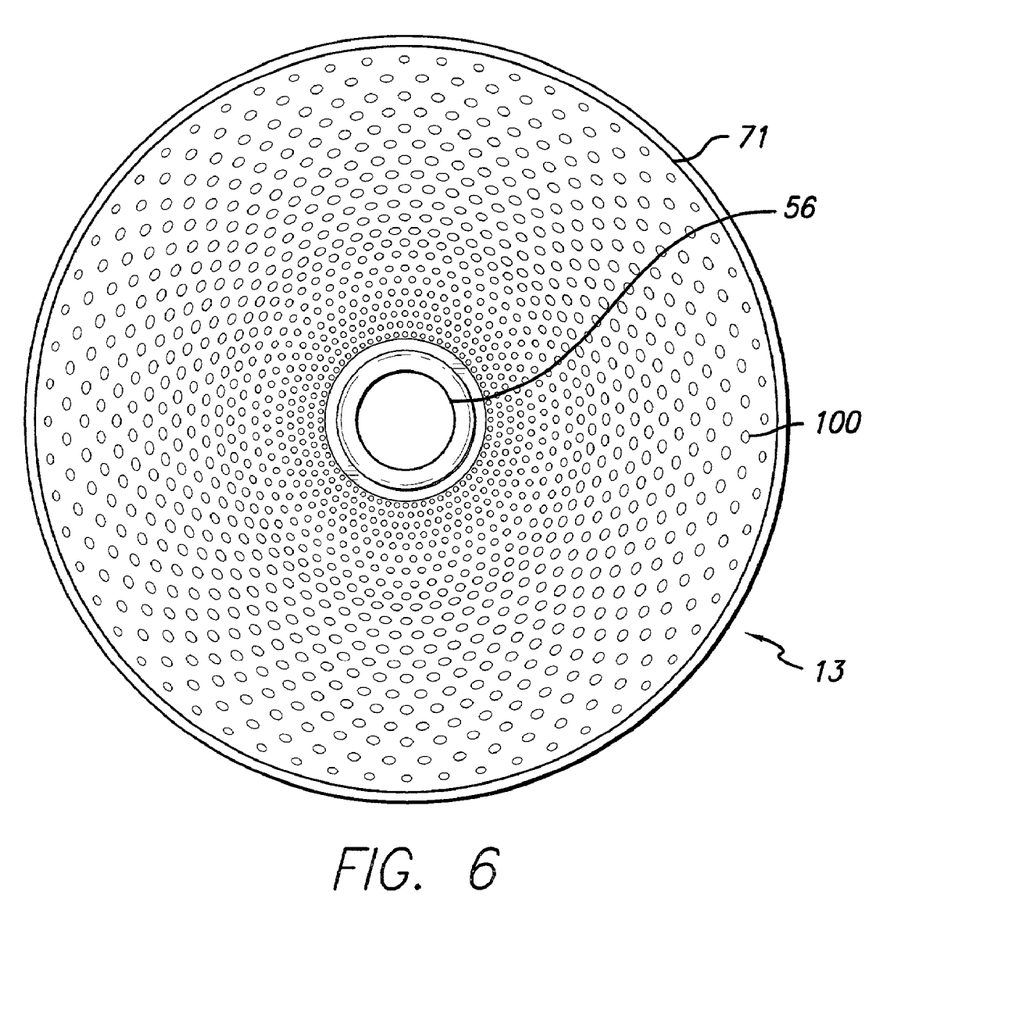
FIG. 6 is a detailed front view of the reflector.

The lens includes a reflective surface, the reflective surface 71 being substantially parabolic with multiple protrusions 100 arranged on the reflective surface 71. The multiple protrusions 100 are substantially hemispherical protrusions arranged around the reflective surface. The protrusions are arranged in rows from a base of the parabolic reflector 71 towards the edge of the parabolic reflector. There are multiple protrusions 100 in each row. Successive rows are offset relative to protrusions in adjacent rows. The protrusions 100 substantially adjacent to the base of the parabolic reflector are relatively smaller than the size of the protrusions towards the edge of the parabolic reflector 71.

The protrusions 100 which are substantially hemispherical formations have a diameter at the area towards the edge of the reflector is greater than the diameter of the hemispheres toward the base of the parabolic reflector 13.

The spacing between the protrusions 100 in each row is between about 3° to 10° in a radial axis, the axis being directed through the base of the parabolic reflector. The spacing of the protrusions 100 is about 6° in a radial direction around the axis. Each row of protrusions 100 is offset from an adjacent row, the offset being radially determined between about 1° and 10°. The offset is about 3°.

The protrusions 100 are substantially hemispherical formations and the diameter of the hemispheres at the area towards the edge of the reflector is greater than the diameter of the hemispheres toward the base of the parabolic reflector. The diameter of the hemispheres toward the edge of the reflector is about 0.04 inches and the diameter toward the base is about 0.02 inches and the hemispheres between the base and the edge are incrementally different sizes increasing from the base toward the edge. There are about 1,260 hemispheres arranged in about 21 rows from the base of the parabolic reflector toward the edge.

The lamp 54 includes a filament, the filament being located substantially at the vertex of the parabolic reflector 13 and the array of protrusions 100 on the reflector surface 71 is adapted to disperse a fraction of light intensity into a relatively conical pattern of light, the dispersion resulting into a relatively larger diameter of light pattern emanating from the lamp.

A further feature of the flashlight is the relatively egg-shaped of the barrel 15. It is formed into a substantially partial egg shape with the forward end truncated. Essentially it is about half an egg, which is formed from the rear end of the barrel and is truncated in the area about the point 21 where there are threads for engaging the cap 17. The forward end is thus truncated by the cap or lens.

In FIG. 3 there is shown the circuit board which forms the basis for the electronic switch 12. the reed switch 68 and transistor 69 are mounted on the board, and through the contacts, there is closed circuit with the batteries 11a through 11h and the lamp 54.

The battery pack 45 with the eight batteries arranged in the battery housing suitably to use up the internal space in the barrel in a space-saving manner and in a way minimizing bulk and also use the space efficiently so as not to create negative buoyancy in the light when used underwater. The batteries of the battery pack can be non-rechargeable or rechargeable as desired by a user. The batteries are mounted in a housing, the housing being removable from the barrel when the cap is removed from the barrel. The housing is a substantially cylindrical element for mounting multiple batteries in an axial relationship around the axis of the housing. There is a mounting for a switch and circuit on an outside wall of the housing. The switch is electronic, and includes a reed switch operable by the trigger on the handle. The operation of the flashlight by the switch is effected by an element mounted on the flashlight unassociated with the housing The electrical components for closing the circuit with the batteries are included in the housing. The operation of the flashlight by the switch is effected by an element mounted on the flashlight unassociated with the housing, namely an element mounted on the handle.

The batteries are located in the barrel in a manner to relatively maximize the battery power and minimize the amount of unused space in the barrel. The handle and barrel are ergonomically structured to promote a balance in the flashlight. The flashlight with six batteries mounted in the barrel can balance to enable the flashlight to stand on a base of the handle without tipping forward or backward. The handle is formed of elements cut out from structure forming the handle so as to enhance lightness of the handle while at the same time retaining the structural strength of the handle. The handle includes two component materials, a relatively more rigid forward material to be gripped by fingers of a user and a relatively less flexible material for location about the base of a hand of a user when the hand of a user surrounds the handle.

Many other examples of the invention exist, each differing from others in matters of detail only. The invention is to be determined solely by the following claims

What is claimed is:

1. A flashlight comprising:
a) a barrel, the barrel being for mounting batteries such that when the batteries are in the barrel, an array of several batteries are in side by side relationship radially around a central longitudinal axis extending trough the barrel, a lamp, a switch, a circuit, the switch being for opening and closing the circuit, the circuit being between the batteries and the lamp;

b) a lens;
c) a reflective surface with substantially hemispherical multiple protrusions, wherein a size and a density of the substantially hemispherical multiple protrusions on the reflective surface are selected to control a fraction of concentrated light emanating from the lamp, reflected by the reflective surface, and transformed into a dispersed light of larger diameter;
d) a cap for the barrel; and
e) a pistol grip handle extending transversely from the barrel.

2. A flashlight as claimed in claim 1 wherein the handle includes a mounting for a trigger, the trigger including magnetic means being operable to activate the switch through a wall of the barrel, and the switch being contained inside the barrel.

3. A flashlight as claimed in claim 1 wherein the barrel has a forward end and a rear end, and the handle engages the barrel at a position substantially midway between the forward end and the rear end.

4. A flashlight as claimed in claim 1 wherein the barrel is substantially partially egg-shaped from the forward end to the rear end, and the forward end being substantially truncated and being for receiving the cap in a sealing relationship with the barrel.

5. A flashlight as claimed in claim 4 wherein the truncation effectively creates a half-egg shape.

6. A flashlight as claimed in claim 2 wherein the trigger is mounted in a housing, the housing being removably located in a receptacle, and the housing being capable of being selectively removed from the receptacle.

7. A flashlight as claimed in claim 6 including locking means on the handle, the locking means being a slidable element mounted in the handle for movement towards and away from the housing of the trigger, and when moved in a position towards the housing of the trigger acts to lock the trigger in one position and thereby promote containing the housing in a receptacle in the handle and wherein movement of the slidable element from the position engaging the trigger acts to permit the trigger to move between on and off positions.

8. A flashlight as claimed in claim 2 wherein the trigger is contained in a housing, and the housing is at least partly retained in position in a receptacle in the handle by the cap.

9. A flashlight as claimed in claim 1 including a gasket between the cap and the barrel, the gasket permitting a watertight seal to be formed between the barrel, the gasket, the cap and a transparent face mounted with the cap.

10. A flashlight comprising:
a) a barrel, the barrel being for mounting batteries such that when the batteries are in the barrel, an array of several batteries are in side by side relationship radially around a central longitudinal axis extending through the barrel, a lamp, a switch, a circuit, the switch being for opening and closing the circuit, the circuit being between the batteries and the lamp;
b) a lens;
c) a cap for the barrel;
d) a pistol grip handle extending transversely from the barrel; and
e) a reflective surface, the reflective surface being substantially parabolic with multiple protrusions arranged on the reflective surface, wherein the multiple protrusions are substantially hemispherical protrusions of a size and a density selected to control a fraction of concentrated light emanating from the lamp reflected by the reflective surface and transformed into a dispersed light of larger diameter.

11. A flashlight as claimed in claim 10 wherein the protrusions are arranged in rows from a base of the parabolic reflector towards the edge of the parabolic reflector, there being multiple protrusions in each row.

12. A flashlight comprising:
a) a barrel, the barrel being for mounting batteries such that when the batteries are in the barrel, an array of several batteries are in side by side relationship radially around a central longitudinal axis extending through the barrel, a lamp, a switch, a circuit, the switch being for opening and closing the circuit, the circuit being between the batteries and the lamp;
b) a lens;
c) a cap for the barrel;
d) a pistol grip handle extending transversely from the barrel; and
e) a reflective surface, the reflective surface being substantially parabolic with multiple protrusions arranged on the reflective surface, wherein the multiple protrusions are substantially hemispherical protrusions arranged around the reflective surface, wherein the protrusions are arranged in rows from a base of the parabolic reflector towards the edge of the parabolic reflector, there being multiple protrusions in each row, and
wherein successive rows are offset relative to protrusions in adjacent rows.

13. A flashlight as claimed in claim 12 wherein the protrusions substantially adjacent to the base of the parabolic reflector are relatively smaller than the size of the protrusions towards the edge of the parabolic reflector.

14. A flashlight as claimed in claim 13 wherein the spacing between the protrusions in each row is between about 3° to 10° in a radial axis, the axis being directed through the base of the parabolic reflector.

15. A flashlight as claimed in claim 14 wherein the spacing of the protrusions is about 6° in a radial direction around the axis.

16. A flashlight as claimed in claim 12 wherein each row of protrusions is offset from an adjacent row, the offset being radially determined between about 1° and 10°.

17. A flashlight as claimed in claim 16 wherein the offset is about 3°.

18. A flashlight as claimed in claim 12 wherein the protrusions are substantially hemispherical formations and the diameter of the substantially hemispherical formations at the area towards the edge of the reflector is greater than the diameter of the substantially hemispherical formations toward the base of the parabolic reflector.

19. A flashlight as claimed in claim 18 wherein the diameter of the formation toward the edge of the reflector is about 0.04 inches and the diameter toward the base is about 0.02 inches and the formations between the base and the edge are incrementally different sizes increasing from the base toward the edge.

20. A flashlight as claimed in claim 12 wherein there are about 1,260 formations arranged in about 21 rows from the base of the parabolic reflector toward the edge.

21. A flashlight as claimed in claim 12 wherein the lamp includes a filament, the filament being located substantially at the vertex of the parabolic reflector and wherein the array of protrusions on the reflector surface is adapted to disperse a fraction of light intensity into a relatively conical pattern of light, the dispersion resulting into a relatively larger diameter of light pattern emanating from the lamp.

22. A flashlight as claimed in claim 12 wherein the size and density of the protrusions on the parabolic surface is selected to control the fraction of concentrated light emanating from the lamp and reflected by the parabolic surface and transformed into dispersed light of larger diameter.

23. A flashlight as claimed in claim 12 wherein the size and density of the protrusions on the reflective surface are selected thereby to create a substantially consistent light intensity through the area of increased diameter pattern, the increased diameter pattern being outside of the center column of higher intensity light reflected by the parabolic effect of the reflector.

24. A flashlight as claimed in claim 1 wherein the reflective surface is substantially parabolic, wherein the substantially hemispherical protrusions a texture which is applied to the reflective surface of the parabolic lens, the texture acting to blend a column of light normally reflected by a lamp located at the vertex of the parabolic reflector and dispersed patterns of light obtained by reflections from protrusions on the reflective surface, the blending acting to reduce a visual irregularity caused by at least one of an unsymmetrical filament in a lamp, an imperfect filament location relative to a vertex of the parabolic reflector, or imperfections in a shape of the reflector.

25. A flashlight comprising:
a) a barrel, the barrel being for mounting batteries such that when the batteries are in the barrel, an array of several batteries are in side by side relationship radially around a central longitudinal axis extending through the barrel, a lamp, a switch, a circuit, the switch being for opening and closing the circuit, the circuit being between the batteries and the lamp;
b) a lens;
c) a cap for the barrel;
d) a pistol grip handle extending transversely from the barrel, wherein the body portion of the handle includes weight reducing elements, the at least one element forming at least one void in the handle, the at least one element being formed so as to retain the structural strength of the handle;
e) batteries, wherein the batteries are mounted in a housing, the housing being removable from the barrel when the cap is removed from the barrel;
f) a mounting for a switch and circuit on an outside wall of the housing, the housing being removable from the barrel when the cap is removed from the barrel; and
wherein the housing is a substantially cylindrical element for mounting multiple batteries in an axial relationship around the axis of the housing.

26. A flashlight as claimed in claim 25 including contacts external to the housing for mounting batteries on an outside wall of the housing.

27. A flashlight as claimed in claim 26 wherein the outside wall is the base of the housing.

28. A flashlight as claimed in claim 25 including a closure to the housing, the closure to the housing including means for mounting the lamp.

29. A flashlight as claimed in claim 25 wherein the closure is mounted to close the housing in a tongue and groove manner, the closure and opening being effected by relative rotation of the closure member on one end of the housing.

30. A flashlight as claimed in claim 25 wherein the switch includes a reed switch operable by the trigger on the handle.

31. A flashlight as claimed in claim 1, including batteries, wherein the batteries are rechargeable.

32. A flashlight as claimed in claim 25 wherein the housing includes the electrical components for the batteries, the batteries and whereby the operation of the flashlight by the switch is effected by an element mounted on the flashlight unassociated with the housing.

33. A flashlight as claimed in claim 25, including batteries, and wherein the batteries are located in the barrel in a manner to relatively maximize the battery power and minimize the amount of unused space in the barrel.

34. A flashlight comprising:
a) a barrel, the barrel being for mounting batteries such that when the batteries are in the barrel, an array of several batteries are in side by side relationship radially around a central longitudinal axis extending through the barrel, a lamp, a switch, a circuit, the switch being for opening and closing the circuit, the circuit being between the batteries and the lamp;
b) a lens;
c) a cap for the barrel; and
d) a pistol grip handle extending transversely from the barrel, wherein the handle and barrel are ergonomically structured to promote a balance in the flashlight thereby to substantially balance the flashlight with eight batteries mounted in the barrel to enable the flashlight to stand on a base of the handle without tipping forward or backward.

35. A flashlight as claimed in claim 34 wherein the handle is formed of elements cut out from structure forming the handle so as to enhance lightness of the handle while at the same time retaining the structural strength of the handle.

36. A flashlight as claimed in claim 35 wherein the handle includes two component materials, a relatively more rigid forward material to be gripped by fingers of a user and a relatively less flexible material for location about the base of a hand of a user when the hand of a user surrounds the handle.

37. A flashlight comprising:
a) a barrel, the barrel being for mounting batteries and being substantially egg-shaped from a forward end, which the forward end is substantially truncated effectively creating a half-egg shape, to a rear end, a lamp, a switch, a circuit, the switch being for opening and closing the circuit, the circuit being between the batteries and the lamp;
b) a lens;
c) batteries being mounted in the barrel to enable the flashlight to stand on a base of a handle of the flashlight, without tipping forward or backward;
d) a cap for the barrel; and
e) a trigger, the trigger including magnetic means being operable to activate the switch through a wall of the barrel, and the switch being contained inside the barrel.

38. A flashlight as claimed in claim 37 wherein the trigger is mounted in a housing, the housing being removably located in a receptacle, and the housing being capable of being selectively removed from the receptacle.

39. A flashlight comprising:
a) a barrel, a housing separable from the barrel and locatable in the barrel, the housing being for mounting batteries, a lamp, a switch, a circuit, the switch being for opening and closing the circuit, the circuit being between the batteries and the lamp, and the switch;
b) a lens for the barrel;
c) a substantially parabolic reflective surface, the reflective surface being substantially parabolic with multiple irregularities arranged on the reflective surface, and with at least one indentation on the reflective surface; and d) multiple substantially hemispherical protrusions being applied to the substantially parabolic reflective surface with a size and a density of each of the multiple substantially hemispherical protrusions chosen to create a dispersion of light in a conical peripheral pattern relative to a central column of light.

40. A flashlight as claimed in claim 39 wherein the protrusions are arranged in rows from a base of the substantially parabolic reflector towards the edge of the substantially parabolic reflector, there being multiple protrusions in each row.

41. A flashlight comprising:
a) a barrel, a housing separable from the barrel and locatable in the barrel, the housing being for mounting batteries, a lamp, a switch, a circuit, the switch being for opening and closing the circuit, the circuit being between the batteries and the lamp, and the switch;
b) a lens for the barrel; and
c) a reflective surface, the reflective surface being substantially parabolic with multiple irregularities arranged on the reflective surface, wherein multiple irregularities are substantially hemispherical protrusions arranged around the reflective surface,
wherein the irregularities are arranged in rows from a base of the parabolic reflector towards the edge of the parabolic reflector, there being multiple protrusions in each row, and wherein successive rows are offset relative to irregularities in adjacent rows.

42. A flashlight comprising:
a) a barrel, a housing separable from the barrel and locatable in the barrel, the housing being for mounting batteries, a lamp, a switch, a circuit, the switch being for opening and closing the circuit, the circuit being between the batteries and the lamp, and the switch;
b) a lens for the barrel; and
c) a reflective surface, the reflective surface being substantially parabolic with multiple irregularities arranged on the reflective surface, wherein the irregularities substantially adjacent to the base of the parabolic reflector are relatively smaller than the size of the protrusions towards the edge of the parabolic reflector.

43. A flashlight comprising:
a) a barrel, the barrel being for mounting batteries such that when the batteries are in the barrel, an array of several batteries are in side by side relationship radially around a central longitudinal axis extending through the barrel, a lamp, a switch, a circuit, the switch being for opening and closing the circuit, the circuit being between the batteries and the lamp;
b) a lens, and a reflective surface, the reflective surface being substantially parabolic with multiple protrusions arranged on the reflective surface, the multiple protrusions being substantially hemispherical protrusions arranged around the reflective surface, and the protrusions being arranged in rows from a base of the parabolic reflector towards the edge of the parabolic reflector, there being multiple protrusions in each row;
c) a cap for the barrel; and
d) a pistol grip handle extending transversely from the barrel,
wherein successive rows are offset relative to protrusions in adjacent rows.

44. A flashlight comprising:
a) a barrel, the barrel being for mounting batteries such that when the batteries are in the barrel, an array of several batteries are in side by side relationship radially around a central longitudinal axis extending through the barrel, a lamp, a switch, a circuit, the switch being for opening and closing the circuit, the circuit being between the batteries and the lamp;
b) a lens, and a reflective surface, the reflective surface being substantially parabolic with multiple protrusions arranged on the reflective surface, the multiple protrusions being substantially hemispherical protrusions arranged around the reflective surface, and the protrusions being arranged in rows from a base of the parabolic reflector towards the edge of the parabolic reflector, there being multiple protrusions in each row;
c) a cap for the barrel; and
d) a pistol grip handle extending transversely from the barrel, wherein each row of protrusions is offset from an adjacent row, the offset being radially determined between about 1° and 10°.

45. A flashlight comprising:
a) a barrel, the barrel being for mounting batteries such that when the batteries are in the barrel, an array of several batteries are in side by side relationship radially around a central longitudinal axis extending through the barrel, a lamp, a switch, a circuit, the switch being for opening and closing the circuit, the circuit being between the batteries and the lamp;
b) a lens, and a reflective surface, the reflective surface being substantially parabolic with multiple protrusions arranged on the reflective surface, the multiple protrusions being substantially hemispherical protrusions arranged around the reflective surface, and the protrusions being arranged in rows from a base of the parabolic reflector towards the edge of the parabolic reflector there being multiple protrusions in each row;
c) a cap for the barrel; and
d) a pistol grip handle extending transversely from the barrel,
wherein there are about 1,260 protrusions arranged in about 21 rows from the base of the parabolic reflector toward the edge.

46. A flashlight comprising:
a) a barrel, the barrel being for mounting batteries such that when the batteries are in the barrel, an array of several batteries are in side by side relationship radially around a central longitudinal axis extending through the barrel, a lamp, a switch, a circuit, the switch being for opening and closing the circuit, the circuit being between the batteries and the lamp;
b) a lens, and a reflective surface, the reflective surface being substantially parabolic, wherein a texture is applied to the reflective surface of the parabolic lens, the texture acting to blend a column of light normally reflected by a lamp located at the vertex of the parabolic reflector and dispersed patterns of light obtained by reflections from protrusions on the reflective surface, the blending acting to reduce a visual irregularity caused by at least one of an unsymmetrical filament in a lamp, an imperfect filament location relative to a vertex of the parabolic reflector, or imperfections in a shape of the reflector;
c) a cap for the barrel; and
d) a pistol grip handle extending transversely from the barrel.

47. A flashlight comprising:
a) a barrel, the barrel being for mounting batteries, a lamp, a switch, a circuit, the switch being for opening and closing the circuit, the circuit being between the batteries and the lamp,
b) a lens;
c) a reflective surface forming a textured parabolic reflective surface with multiple formations, the texture acting to blend a column of light normally reflected by a lamp located at the vertex of the parabolic reflector and dispersed patterns of light obtained by reflections from protrusions on the reflective surface, the blending acting to reduce a visual irregularity caused by at least one of an unsymmetrical filament in a lamp, an imperfect filament location relative to a vertex of the parabolic reflector, or imperfections in a shape of the reflector, wherein the size and density of the formations on the reflective surface are selected thereby to create a substantially consistent light intensity through the area of increased diameter pattern, the increased diameter pattern being outside of a center column of higher intensity light reflected by the parabolic effect of the reflector;
d) a cap for the barrel;
e) a pistol grip handle extending transversely from the barrel; and
f) wherein batteries are mountable in a housing, the housing being removable from the barrel when the cap is removed from the barrel including contacts external to the housing for mounting batteries on an outside wall of the housing.

48. A flashlight comprising:
a) a barrel, the barrel being for mounting batteries, a lamp, a switch, a circuit, the switch being for opening and closing the circuit, the circuit being between the batteries and the lamp,
b) a lens;
c) a reflective surface forming a textured parabolic reflective surface with multiple formations, the texture acting to blend a column of light normally reflected by a lamp located at the vertex of the parabolic reflector and dispersed patterns of light obtained by reflections from protrusions on the reflective surface, the blending acting to reduce a visual irregularity, wherein the size and density of the formations on the reflective surface are selected thereby to create a substantially consistent light intensity through the area of increased diameter pattern, the increased diameter pattern being outside of a center column of higher intensity light reflected by the parabolic effect of the reflector;
d) a cap for the barrel;
e) a pistol grip handle extending transversely from the barrel; and
f) a closure to a housing for batteries, the closure to the housing including means for mounting the lamp.

49. A flashlight as claimed in claim 48 wherein the closure is mounted to close the housing in a tongue and groove manner, the closure and opening being effected by relative rotation of the closure member on one end of the housing.

50. A flashlight as claimed in the claim 47 wherein the housing includes the electrical components for the batteries, whereby the operation of the flashlight by the switch is effected by an element mounted on the flashlight unassociated with the housing, wherein the handle and the barrel are ergonomically structured to promote a balance in the flashlight thereby to substantially balance the flashlight with eight batteries mounted in a barrel to enable the flashlight to stand on a base of the handle without tipping forward or backward.

51. A flashlight comprising:
a) a barrel, the barrel being for mounting batteries, a lamp, a switch, a circuit, the switch being for opening and closing the circuit, the circuit being between the batteries and the lamp,
b) a lens;
c) a cap for the barrel;
d) a pistol grip handle extending transversely from the barrel; and
e) wherein the handle and barrel are ergonomically structured to promote a balance in the flashlight thereby to substantially balance the flashlight with eight batteries mounted in the barrel to enable the flashlight to stand on a base of the handle without tipping forward or backward, wherein the handle is formed of elements cut out from a structure forming the handle so as to enhance lightness of the handle while at the same time retaining the structural strength of the handle.

52. A flashlight as claimed in claim 51 wherein the handle includes two component materials, a relatively more rigid forward material to be gripped by fingers of a user and a relatively less flexible material for location about the base of a hand of a user when the hand of a user surrounds the handle.

53. A flashlight comprising:
a) a barrel, the barrel being for mourning batteries, a lamp, a switch, a circuit, the switch being for opening and closing the circuit, the circuit being between the batteries and the lamp;
b) a lens for the barrel; and
c) a reflective surface, the reflective surface being substantially parabolic with multiple irregularities arranged on the reflective surface wherein the irregularities are arranged in rows from a base of the parabolic reflector towards the edge of the parabolic reflector, there being multiple substantially hemispherical protrusions in each row, and wherein successive rows are offset relative to irregularities in adjacent rows.

54. A flashlight comprising:
a) a barrel, the barrel being for mounting batteries, a lamp, a switch, a circuit, the switch being for opening and closing the circuit, the circuit being between the batteries and the lamp;
b) a lens for the barrel; and
c) a reflective surface, the reflective surface being substantially parabolic with multiple substantially hemispherical irregularities arranged on the reflective surface, wherein the irregularities substantially adjacent to the base of the parabolic reflector are relatively smaller than the size of the protrusions towards the edge of the parabolic reflector.

55. A flashlight comprising:
a) a barrel, the barrel being for mounting batteries, a lamp, a switch, a circuit, the switch being for opening and closing the circuit, the circuit being between the batteries and the lamp;
b) a lens;
c) a cap for the barrel; and
d) a pistol grip handle extending transversely from the barrel, wherein the handle includes a mounting for a trigger, the trigger including magnetic means being operable to activate the switch through a wall of the barrel, and the switch being contained inside the barrel, wherein the handle is formed of elements cut out from a structure forming the handle so as to enhance lightness of the handle while at the same time retaining the structural strength of the handle.

56. A flashlight as claimed in claim 55 wherein the trigger is mounted in a housing, the housing being removably located in a receptacle, and the housing being capable of being selectively removed from the receptacle.

57. A flashlight as claimed in claim 55 wherein the lens includes a reflective surface, the reflective surface being substantially parabolic with multiple protrusions arranged on the reflective surface.

58. A flashlight as claimed in claim 55 wherein the lens includes a reflective surface, the reflective surface being substantially parabolic, wherein a texture is applied to the reflective surface of the parabolic lens, the texture acting to blend a column of light normally reflected by a lamp located at the vertex of the parabolic reflector and dispersed patterns of light obtained by reflections from protrusions on the reflective surface, the blending acting to reduce a visual irregularity caused by at least one of an unsymmetrical filament in a lamp, an imperfect filament location relative to a vertex of the parabolic reflector, or imperfections in a shape of the reflector.

59. A flashlight as claimed in claim 55 including batteries, wherein the batteries are mounted in a housing, the housing being removable from the barrel when the cap is removed from the barrel.

60. A flashlight as claimed in claim 55 wherein the handle and barrel are ergonomically structured to promote a balance in the flashlight thereby to substantially balance the flashlight with eight batteries mounted in the barrel to enable the flashlight to stand on a base of the handle without tipping forward or backward.

61. A flashlight as claimed in claim 55 wherein the handle is formed of elements cut out from structure forming the handle so as to enhance lightness of the handle while at the same time retaining the structural strength of the handle.

62. A flashlight comprising:
a) a barrel, the barrel being for mounting batteries and being substantially egg-shaped from a forward end, which the forward end is substantially truncated effectively creating a half-egg shape, to a rear end, a lamp, a switch, a circuit, the switch being for opening and closing the circuit, the circuit being between the batteries and the lamp;
b) a lens;
c) a cap for the barrel; and
d) a trigger, the trigger including magnetic means being operable to activate the switch through a wall of the barrel, wherein the batteries are mounted in a housing, the housing being removable from the barrel wherein the housing is a substantially cylindrical element for mounting multiple batteries in an axial relationship around the axis of the housing and the switch being contained inside the barrel.

63. A flashlight comprising:
a) a barrel, the barrel being for mounting batteries, a lamp, a switch, a circuit, the switch being for opening and closing the circuit, the circuit being between the batteries and the lamp;
b) a lens for the barrel; and
c) a reflective surface, the reflective surface being substantially parabolic with multiple irregularities arranged on the reflective surface,
wherein the barrel is substantially partially egg-shaped from the forward end to the rear end, and the forward end being substantially truncated and being for receiving the cap in a sealing relationship with the barrel, and wherein the truncation effectively creates a half-egg shape.

64. A flashlight as claimed in claim 63 wherein the multiple irregularities are substantially hemispherical protrusions arranged around the reflective surface.

65. A flashlight as claimed in claim 63 wherein the irregularities are arranged in rows from a base of the parabolic reflector towards the edge of the parabolic reflector, there being multiple protrusions in each row.

66. A flashlight comprising:
   a) a barrel, the barrel being for mounting batteries, a lamp, a switch, a circuit, the switch being for opening and closing the circuit, the circuit being between the batteries and the lamp;
   b) a lens for the barrel; and
   c) a reflective surface, the reflective surface being substantially parabolic with multiple irregularities arranged on the reflective surface,
   wherein the irregularities are arranged in rows from a base of the parabolic reflector towards the edge of the parabolic reflector, there being multiple protrusions in each row, and
   wherein successive rows are offset relative to irregularities in adjacent rows.

67. A flashlight comprising:
   a) a barrel, the barrel being for mounting batteries, a lamp, a switch, a circuit, the switch being for opening and closing the circuit, the circuit being between the batteries and the lamp;
   b) a lens for the barrel; and
   c) a reflective surface, the reflective surface being substantially parabolic with multiple irregularities arranged on the reflective surface,
   wherein the irregularities are arranged in rows from a base of the parabolic reflector towards the edge of the parabolic reflector, there being multiple protrusions in each row,
   wherein successive rows are offset relative to irregularities in adjacent rows, and
   wherein the irregularities substantially adjacent to the base of the parabolic reflector are relatively smaller than the size of the protrusions towards the edge of the parabolic reflector.

68. A flashlight comprising:
   a) a barrel, the barrel being for mounting batteries such that when the batteries are in the barrel, an array of several batteries are in side by side relationship radially around a central longitudinal axis extending through the barrel, a lamp, a switch, a circuit, the switch being for opening and closing the circuit, the circuit being between the batteries and the lamp;
   b) a lens;
   c) a reflective surface with substantially hemispherical multiple protrusions;
   d) a cap for the barrel; and
   e) a pistol grip handle extending transversely from the barrel wherein the batteries are mounted in a housing, the housing being removable from the barrel wherein the housing is a substantially cylindrical element for mounting multiple batteries in an axial relationship around the axis of the housing.

* * * * *